(12) United States Patent
Carr

(10) Patent No.: US 6,536,119 B1
(45) Date of Patent: Mar. 25, 2003

(54) HEDGE CUTTING SYSTEM

(76) Inventor: Alvin W. Carr, 34115 County Rd. 23-A, Woodland, CA (US) 95695

( * ) Notice: Subject to any disclaimer, the term of this patent is extended or adjusted under 35 U.S.C. 154(b) by 0 days.

(21) Appl. No.: 09/895,045

(22) Filed: Jun. 29, 2001

(51) Int. Cl.[7] .............................................. B27B 17/02
(52) U.S. Cl. ............................. 30/371; 30/382; 30/383
(58) Field of Search ......................... 30/371, 124, 381, 30/382, 383; D8/64, 65, 70

(56) References Cited

U.S. PATENT DOCUMENTS

| | | | |
|---|---|---|---|
| 2,642,901 A | | 6/1953 | Hayden |
| 2,698,034 A | * | 12/1954 | Jakku ........................... 30/371 |
| 2,925,105 A | * | 2/1960 | Hayden ........................ 30/371 |
| 3,680,607 A | * | 8/1972 | Robinson ..................... 30/383 |
| 3,815,229 A | | 6/1974 | Granberg |
| 4,142,292 A | | 3/1979 | Ulrich |
| 4,270,272 A | * | 6/1981 | Graham ........................ 30/371 |
| D268,641 S | | 4/1983 | Bonforte |
| 4,858,325 A | * | 8/1989 | Miller .......................... 30/383 |
| 5,123,168 A | | 6/1992 | Lyons |
| 5,511,315 A | * | 4/1996 | Raya ............................ 30/371 |
| 5,669,145 A | * | 9/1997 | Skripsky ...................... 30/371 |
| 5,878,499 A | | 3/1999 | King et al. |

* cited by examiner

*Primary Examiner*—Hwei-Siu Payer

(57) ABSTRACT

A hedge cutting system for cutting branches and other foliage with a chainsaw. The hedge cutting system includes at least one elongated cutting bar for guiding movement of branches of a hedge toward a cutting member while cutting the hedge. The cutting bar is removably mountable on a guide bar of a chainsaw. At least one spacing member is provided for spacing the cutting bar from the guide bar. The spacing member is removably positionable between the cutting bar and the guide bar. A plurality of fastening members is provided for removably fastening the cutting bar and the spacing member together. An end of each of the fastening members is removably extendable through the guide bar such that the cutting bar and the spacing member are removably mountable on the guide bar.

4 Claims, 4 Drawing Sheets

HEDGE CUTTING SYSTEM

BACKGROUND OF THE INVENTION

1. Field of the Invention

The present invention relates to chainsaw attachments and more particularly pertains to a new hedge cutting system for cutting branches and other foliage with a chainsaw.

2. Description of the Prior Art

The use of chainsaw attachments is known in the prior art. More specifically, chainsaw attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,878,499; U.S. Pat. No. 2,642,901; U.S. Pat. No. 3,815,229; U.S. Pat. No. 4,142,292; U.S. Pat. No. 5,123,168; and U.S. Pat. No. Des. 268,641.

While these devices fulfill their respective, particular objectives and requirements, the aforementioned patents do not disclose a new hedge cutting system. The inventive device includes at least one elongated cutting bar for guiding movement of branches of a hedge toward a cutting member while cutting the hedge. The cutting bar is removably mountable on a guide bar of a chainsaw. At least one spacing member is provided for spacing the cutting bar from the guide bar. The spacing member is removably positionable between the cutting bar and the guide bar. A plurality of fastening members is provided for removably fastening the cutting bar and the spacing member together. An end of each of the fastening members is removably extendable through the guide bar such that the cutting bar and the spacing member are removably mountable on the guide bar.

In these respects, the hedge cutting system according to the present invention substantially departs from the conventional concepts and designs of the prior art, and in so doing provides an apparatus primarily developed for the purpose of cutting branches and other foliage with a chainsaw.

SUMMARY OF THE INVENTION

In view of the foregoing disadvantages inherent in the known types of chainsaw attachments now present in the prior art, the present invention provides a new hedge cutting system construction wherein the same can be utilized for cutting branches and other foliage with a chainsaw.

The general purpose of the present invention, which will be described subsequently in greater detail, is to provide a new hedge cutting system apparatus and method which has many of the advantages of the chainsaw attachments mentioned heretofore and many novel features that result in a new hedge cutting system which is not anticipated, rendered obvious, suggested, or even implied by any of the prior art chainsaw attachments, either alone or in any combination thereof.

To attain this, the present invention generally comprises at least one elongated cutting bar for guiding movement of branches of a hedge toward a cutting member while cutting the hedge. The cutting bar is removably mountable on a guide bar of a chainsaw. At least one spacing member is provided for spacing the cutting bar from the guide bar. The spacing member is removably positionable between the cutting bar and the guide bar. A plurality of fastening members is provided for removably fastening the cutting bar and the spacing member together. An end of each of the fastening members is removably extendable through the guide bar such that the cutting bar and the spacing member are removably mountable on the guide bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hedge cutting system apparatus and method which has many of the advantages of the chainsaw attachments mentioned heretofore and many novel features that result in a new hedge cutting system which is not anticipated, rendered obvious, suggested, or even implied by any of the prior art chainsaw attachments, either alone or in any combination thereof.

It is another object of the present invention to provide a new hedge cutting system which may be easily and efficiently manufactured and marketed.

It is a further object of the present invention to provide a new hedge cutting system which is of a durable and reliable construction.

An even further object of the present invention is to provide a new hedge cutting system which is susceptible of a low cost of manufacture with regard to both materials and labor, and which accordingly is then susceptible of low prices of sale to the consuming public, thereby making such hedge cutting system economically available to the buying public.

Still yet another object of the present invention is to provide a new hedge cutting system which provides in the apparatuses and methods of the prior art some of the advantages thereof, while simultaneously overcoming some of the disadvantages normally associated therewith.

Still another object of the present invention is to provide a new hedge cutting system for cutting branches and other foliage with a chainsaw.

Yet another object of the present invention is to provide a new hedge cutting system which includes at least one elongated cutting bar for guiding movement of branches of a hedge toward a cutting member while cutting the hedge. The cutting bar is removably mountable on a guide bar of a chainsaw. At least one spacing member is provided for spacing the cutting bar from the guide bar. The spacing member is removably positionable between the cutting bar and the guide bar. A plurality of fastening members is provided for removably fastening the cutting bar and the spacing member together. An end of each of the fastening members is removably extendable through the guide bar such that the cutting bar and the spacing member are removably mountable on the guide bar.

Still yet another object of the present invention is to provide a new hedge cutting system that cuts small and large branches more quickly and efficiently than with conventional pruning devices.

Even still another object of the present invention is to provide a new hedge cutting system that is mountable to a conventional chainsaw. The present invention makes a chainsaw into a more versatile tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
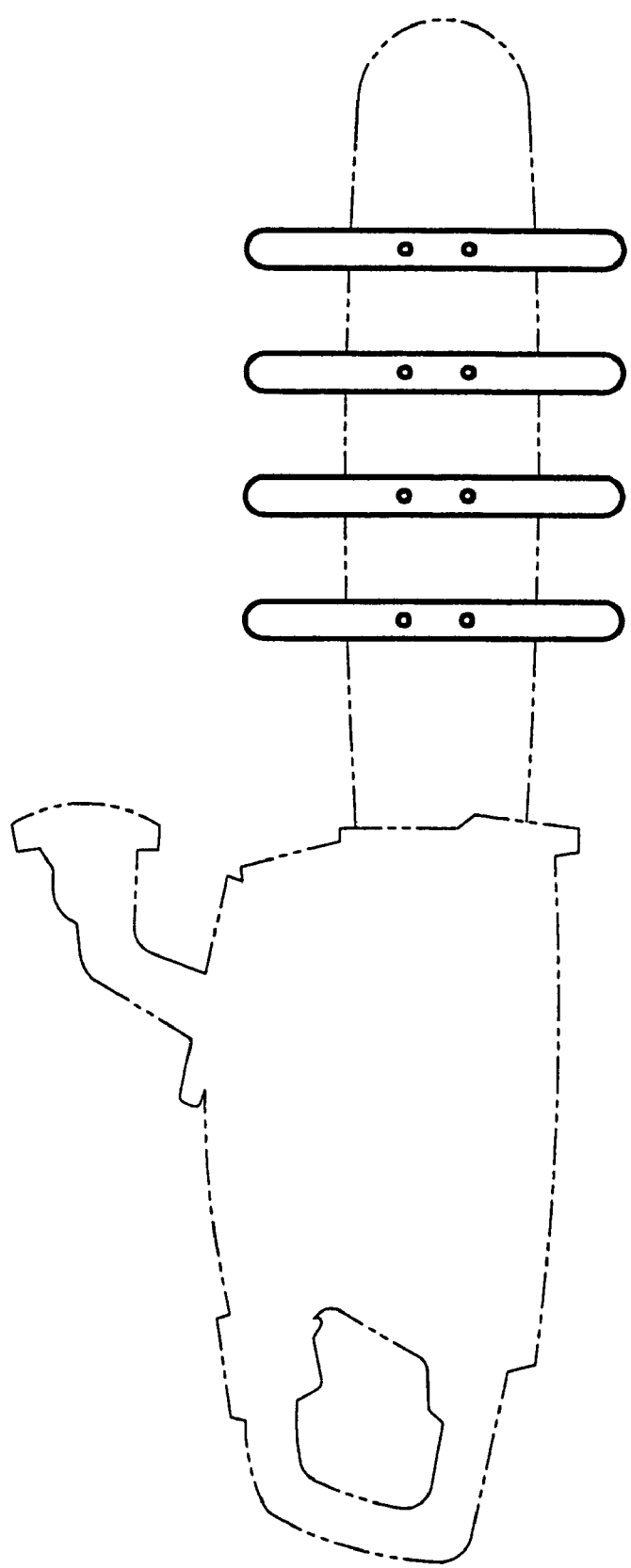
FIG. 1 is a schematic frontal view of a cutting system according to the prior art.

With reference now to the drawings, and in particular to FIGS. 1 through 4 thereof, a new hedge cutting system embodying the principles and concepts of the present invention and generally designated by the reference numeral 10 will be described.

As best illustrated in FIGS. 1 through 4, the hedge cutting system 10 generally comprises at least one cutting bar 20 and at least one spacing member 30 that are mountable on a chainsaw for aiding in cutting branches of a hedge.

In one embodiment of the present invention, a cutting member 12 may be provided for cutting the branches of the hedge. The cutting member 12 may comprise a plurality of teeth 13 pivotally coupled together such that a chain of cutting members 12 is defined.

An elongated guide bar 14 may be provided for guiding movement of the chain of cutting members 12 around a peripheral edge 15 of the guide bar 14. The chain of cutting members 12 is preferably removably positioned in a peripheral groove 16 of the guide bar 14.

A motor 17 may be provided for rotatably moving the chain of cutting members 12 along the; peripheral groove 16 in the peripheral edge 15 of the guide bar 14. An end 18 of the guide bar 14 may be mounted on the motor 17. A portion of the chain of cutting members 12 is operationally coupled to the motor 17.

At least one cutting bar 20 is provided for guiding movement of branches of a hedge toward the cutting members 12 while cutting the hedge. The cutting bar 20 includes an inner surface 21, an outer surface 22 and a pair of opposite ends 23. A central portion 24 of the cutting bar 20 is mountable on the guide bar 14. A width of the cutting bar 20 may taper from the central portion 24 of the cutting bar 20 toward each of the opposite ends 23. A longitudinal axis of the cutting bar 20 is preferably orientated generally perpendicular to a longitudinal axis of the guide bar 14. The cutting bar 20 includes a pair of holes 26 extending through the inner 21 and outer 22 surfaces. In one embodiment of the present invention, a plurality of cutting bars 20 may be provided. Each of the cutting bars 20 may be spaced apart along a length of the guide bar 14. The cutting bar 20 may measure approximately six inches in length and approximately one and one-half inches in width. The cutting bars 20 may comprise a substantially rigid material such as, for example, a metal or plastic material.

At least one spacing member 30 is provided for spacing the cutting bar 20 from the teeth 13 of the cutting member 12. The spacing member 30 is preferably positionable between the cutting bar 20 and the guide bar 14. The spacing member 30 includes a pair of apertures 32 extending therethrough. Each of the apertures 32 in the spacing member 30 are in registration with the holes 26 in the cutting bar 20. The spacing member may measure approximately one-eighth in thickness.

A plurality of fastening members 34 is provided for fastening the cutting bar 20 and the spacing member 30 together. An end 35 of each of the fastening members 34 is removably extended through the holes 26 in the cutting bar 20 and through the apertures 32 in the spacing member 30. The end 35 of each of the fastening members 34 is removably extendable through the guide bar 14 such that the cutting bar 20 and the spacing member 30 are removably mountable to the guide bar 14.

Figure 2:
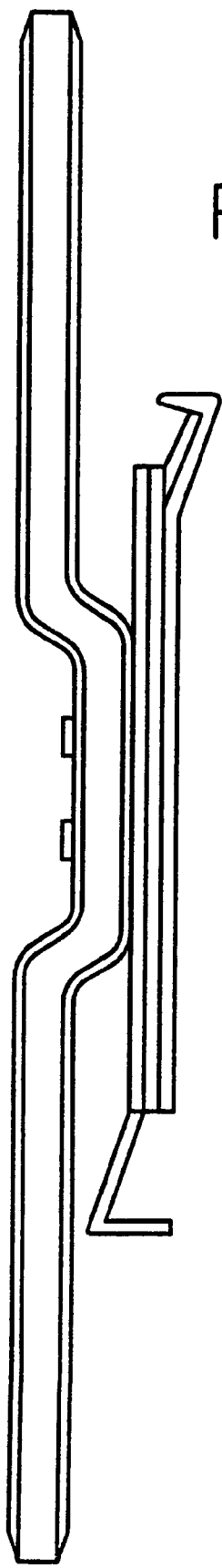
FIG. 2 is a schematic cross-sectional view of the prior art.
Figure 3:
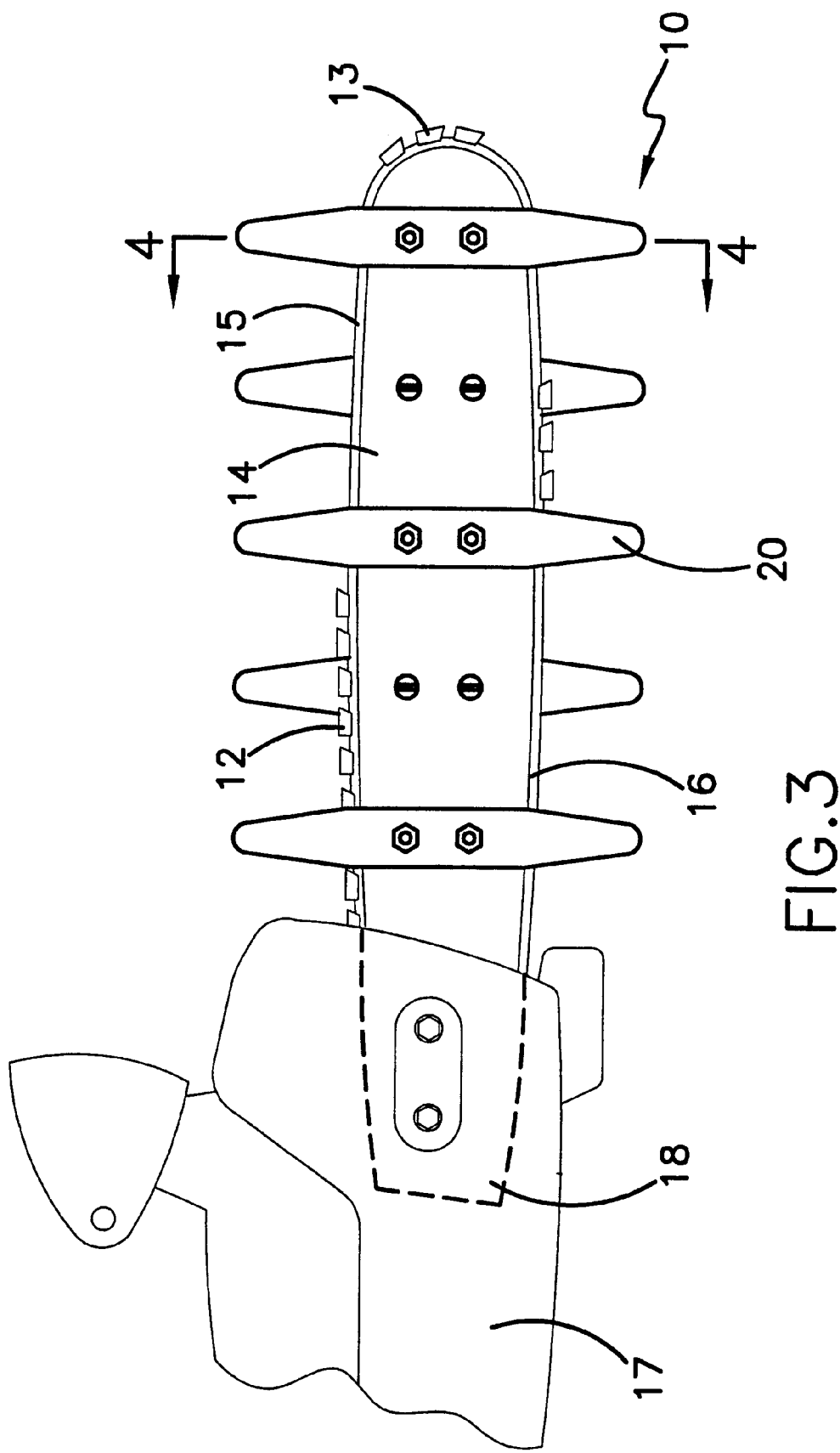
FIG. 3 is a schematic frontal view of a new cutting system according to the present invention.
Figure 4:
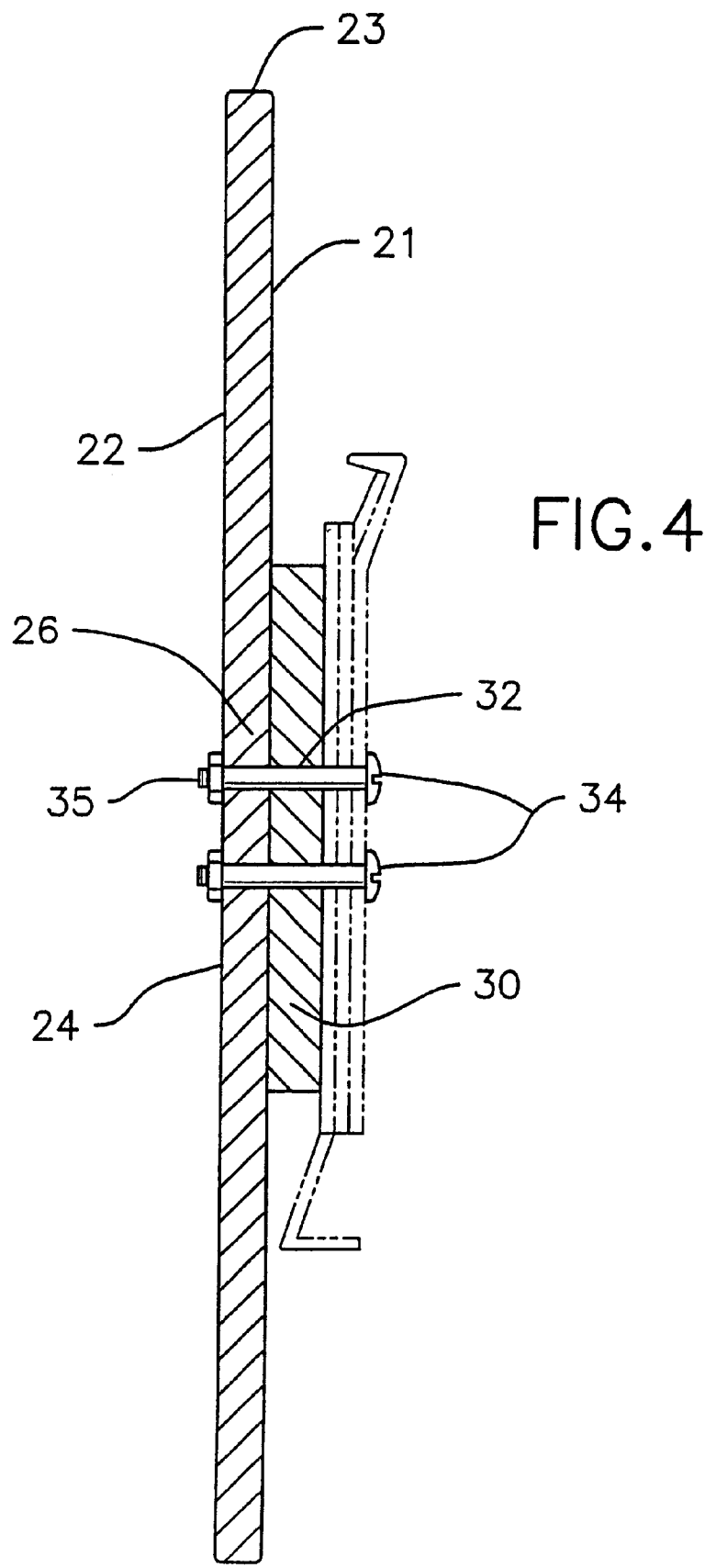
FIG. 4 is a schematic cross-sectional view of the present invention taken along line 4—4 of FIG. 3.

In one embodiment of the present invention, at least one cutting bar 20 and at least one spacing member 30 are removably mountable to a conventional guide bar of a chainsaw. The cutting bar 20 and the spacing member 30 are removably mountable to the guide bar by drilling a pair of holes through the guide bar. The fastening members 34 are removably extended through the cutting bar 20 and the spacing member 30. The fastening members 34 are removably extendable through the guide bar such that the cutting bar 20 and spacing member 30 are removably mounted on the guide bar. As illustrated in FIG. 2, the prior art used a special guide bar to prevent a cutting bar from coming into contact with the cutting member. A user wanting to cut branches of a hedge was required to buy a chainsaw having the special guide bar. As particularly illustrated in FIG. 4, the present invention utilizes a special spacing member that allows a user to attach the cutting members to a conventional guide bar.

In use, branches of a hedge abut the cutting bar 20 when being cut by the cutting member 12. Without the cutting bar 20 the branches of the hedge would be propelled away from the cutting member 12 instead of being cut.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed a readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hedge cutting system for cutting foliage, said system comprising:

a cutting member for cutting the foliage, said cutting member comprising a plurality of teeth, each of said teeth being pivotally coupled together such that a chain of cutting members is defined;

an elongated guide bar for guiding movement of said cutting member around a peripheral edge of said guide bar, said chain of cutting members being removably positioned in a peripheral groove of said guide bar;

a motor for rotatably moving said chain of cutting members along said groove in said peripheral edge of said guide bar, an end of said guide bar being mounted on said motor, a portion of said chain of cutting members being operationally coupled to said motor;

a plurality of elongated cutting bars for guiding movement of branches of a hedge toward said chain of cutting members while cutting the hedge, each of said cutting bars comprising a plate having a central portion and a pair of end portions extending away from said central portion in opposite directions, a length of said central portion being generally equal to a width of the guide bar, each of said end portions having a generally rounded free end;

wherein opposing outer edges of each of said end portions are angled inward toward a central longitudinal axis of said cutting bar from said central portion to a respective free end, each of said cutting bars being spacedly mounted on the opposing sides of the guide bar in an alternating manner along a length of the guide bar;

each of said cutting bars comprising a substantially rigid material;

a plurality of spacing members for spacing said cutting bars from said teeth of said cutting member to prevent said teeth from cutting into said cutting bars, each of said spacing members being positioned between one of said cutting bars and said guide bar, each of said spacing members having a pair of apertures extending therethrough, each of said apertures being in registration with holes in each of said cutting bars; and a plurality of fastening members for fastening each of said cutting bars and said spacing members on the guide bar, an end of each of said fastening members being removably extended through said holes in each of said cutting bars and through said apertures in each of said spacing members, said end of each of said fastening members being removably extendable through said guide bar, wherein each of said cutting bars and said spacing members are removably mountable to said guide bar.

2. A hedge cutting system for cutting branches of a hedge, said system being mountable on a chainsaw, the chainsaw including a cutting member being mounted on a guide bar, said system comprising:

at least one elongated cutting bar for guiding movement of branches of a hedge toward the cutting member while cutting the hedge, said cutting bar being removably mountable on one of opposing sides of the guide bar in a substantially perpendicular manner, said cutting bar comprising a plate having a central portion and a pair of end portions extending away from said central portion in opposite directions a length of said central portion being generally equal to a width of the guide bar of the chainsaw, each of said end portions having a generally rounded free end;

wherein opposing outer edges of each of said end portions are angled inward toward a central longitudinal axis of said cutting bar from said central portion to a respective free end;

at least one spacing member for spacing said cutting bar from the guide bar to prevent the cutting member from cutting into said cutting bar said spacing member being removably positionable between said cutting bar and the guide bar; and a plurality of fastening members for removably fastening said cutting bar and said spacing member together, an end of each of said fastening members being removably extendable through the guide bar such that said cutting bar and said spacing member is removably mountable on the guide bar.

3. The hedge cutting system of claim 1, wherein said central portion of said cutting bar has a pair of holes extending therethrough; and said spacing member having a pair of apertures extending therethrough, each of said apertures being in registration with said holes in said cutting bar, each of said fastening members being removably extended through said holes in said cutting bar and through said apertures in said spacing member to facilitate mounting of said cutting bar and said spacing member to the guide bar of the chainsaw.

4. The hedge cutting system of claim 1, further comprising a plurality of said cutting bars and a plurality of said spacing members being removably mountable to the guide bar; and wherein each of said cutting bars being spacedly mounted on the opposing sides of the guide bar in an alternating manner along a length of the guide bar.

* * * * *